W. F. BROWN.
WING CARRIER.
APPLICATION FILED MAY 22, 1909.

976,629.

Patented Nov. 22, 1910.
6 SHEETS—SHEET 3.

WITNESSES

INVENTOR
Walter F. Brown
BY
ATTORNEYS

W. F. BROWN.
WING CARRIER.
APPLICATION FILED MAY 22, 1909.

976,629.

Patented Nov. 22, 1910.
6 SHEETS—SHEET 4.

WITNESSES

INVENTOR
Walter F. Brown
BY
ATTORNEYS

W. F. BROWN.
WING CARRIER.
APPLICATION FILED MAY 22, 1909.

976,629.

Patented Nov. 22, 1910.
6 SHEETS—SHEET 6.

WITNESSES:

INVENTOR
Walter F. Brown
BY
ATTORNEYS

UNITED STATES PATENT OFFICE.

WALTER FRANK BROWN, OF ST. PAUL, MINNESOTA, ASSIGNOR TO W. F. BROWN COMPANY, OF MINNEAPOLIS, MINNESOTA, A CORPORATION OF MINNESOTA.

WING-CARRIER.

976,629.  Specification of Letters Patent.  Patented Nov. 22, 1910.

Application filed May 22, 1909. Serial No. 497,720.

*To all whom it may concern:*

Be it known that I, WALTER F. BROWN, a citizen of the United States, and a resident of St. Paul, in the county of Ramsey and State of Minnesota, have invented a certain new and useful Wing-Carrier for use on Threshing-Machines, of which the following is a full, clear, and exact description.

The objects which the present invention has in view are: to provide lateral wing carriers for threshing machines and machines of like character, which may be universally mounted upon the majority of such machines of the present standard makes, and which may be detached therefrom; to provide such a carrier which may be retracted into a position where there is no interference when the machine is moved to and from the location in which it is operated; to provide means for adjusting the said carriers to receive from points within a certain radius, which adjustment can be made as, and when, the machine is in operation; and to provide for said carrier, devices whereby the material being handled, may be advanced and automatically released at a given point.

One embodiment of the present invention is shown in the construction illustrated in the accompanying drawings, wherein like characters of reference denote corresponding parts in all the views, and in which—

Heretofore, where wing carriers have been used, they have depended for support in their extended position upon an overhead structure, employing guy ropes, extending to the outer end of the carrier. Another form has depended upon some stilt or truss construction, supporting the outward extension from the ground or underneath cross framework that interferes with the manipulation of the feeder. The principal objections to these forms of carriers have been that in the former construction, the overhead structure was apt to become entangled with the trees or any comparatively low-lying overhead structure. A further objection to this has been that most of the standard makes of threshers, where such contrivances as the wing carriers are most applicable, provide feeders of many different forms and types of construction, some of which are pivoted to the front of the thresher and tilted up and away and swing on said pivots in order to provide means of ingress for inspection or repair to the inner front mechanism of the thresher proper; others in which the extended carrier part of the feeder folds over the top of the feeder; and again, others in which the extended part folds underneath the feeder and which would interfere with the emplacement of an overhead structure, or of an underneath cross frame structure to be used for the support of wing carriers. The objection to the latter structures has been that when secured in position, any movement on the part of the threshing machine has necessitated the disarrangement of the carriers. Another objection has been that the carrier has remained in a more or less fixed position. It is very desirable, in the work that these carriers perform, that the receiving end should be capable of being laterally moved, as the loading station is constantly and gradually changing during the operation of the thresher in front of a stack.

To avoid the objections above noted, I mount the carrier primarily upon the outer end of a boom 14, and upon this boom is pivotally mounted a bracket 15, upon which is carried the weight of the inner or delivery end of the carrier, as hereinafter described. The outer end is carried on a saddle 16, which is held in position by a rod 17 pivotally mounted at 18, in the swinging hinge member 19. The major portion of the weight of the carrier is carried beyond the center of the boom 14, and therefore the supporting strain in the said boom is a torsional one. At the outer end, this torsional strain is received on a long and heavy screw-bolt 20, that extends through a head 21, and is screw-threaded into a perforation formed therefor in the bracket 15. The head 21 has an extended flange 22, which rests against the side of the bracket 15, against which the said bracket is drawn firmly by the bolt 20. To further support the bracket 15, there is provided a tie-rod 23, which engages, by means of an eye, with the bolt 20, and is extended through a suitable perforation in the lower end of the bracket 15 and secured by a nut 24. The said tie-rod acts as a brace against any strain exerted upon the lower extension of the bracket 15. The relation between the bracket 15 and the boom 14 is regulated by a rod 25 in pivotal relation thereto, said rod being extended from the boom 14. The rod 25 is slidably mounted in a lug 27, which is extended from the side of the bracket 15. The rod 25 is screw-threaded throughout, and is provided with two nuts 28 mounted at either side of the lug 27. By turning these nuts in unison, the rod 25 is advanced or retracted through the lug 27, causing the bracket 15 to swing about the bolt 20, thereby changing the angular relation between the boom 14 and the arm 15. The object of this shifting of the bracket 15 is to bring to and hold the said bracket 15 to an upright or vertical position relative to the vertical parts of the front of the thresher. This construction is provided with this adjustment as there will be a variance of angle of the boom 14 when attached to different makes of machines.

To the lower end of the bracket 15 is pivotally connected a socket 29, the lower end of which is provided with U-shaped extensions 30, adapted to engage universal pivots 31 provided at the lower end of the bracket 15. A cotter-pin 32 is driven through the ends of the extensions 30 to retain the socket 29 in position. Into the socket 29 is introduced a screw-threaded rod 33, provided with a groove 34 in its inner end, which receives a pin 35 suitably inserted through the walls of the socket 29. The screw-threaded end of the rod 33 is inserted within a pipe member 36, in which it is secured by a suitable screw-thread connection. At the upper end, the pipe member 36 is provided with a cap 37, which is hinged to a cap 38 provided to receive the outer end of the rod 17. When the rod 33 is rotated by any handle, such as 39, or any other suitable device, it turns within the socket 29 in fixed relation thereto, while the threaded connection between the said rod and the pipe member 36, causes the pipe member 36 to be drawn toward or extended from the connection with the pivot 31 at the end of the bracket 15. This action produces the effect of raising or lowering the saddle 16 and the carrier 40 which rests upon said saddle.

Figure 1:
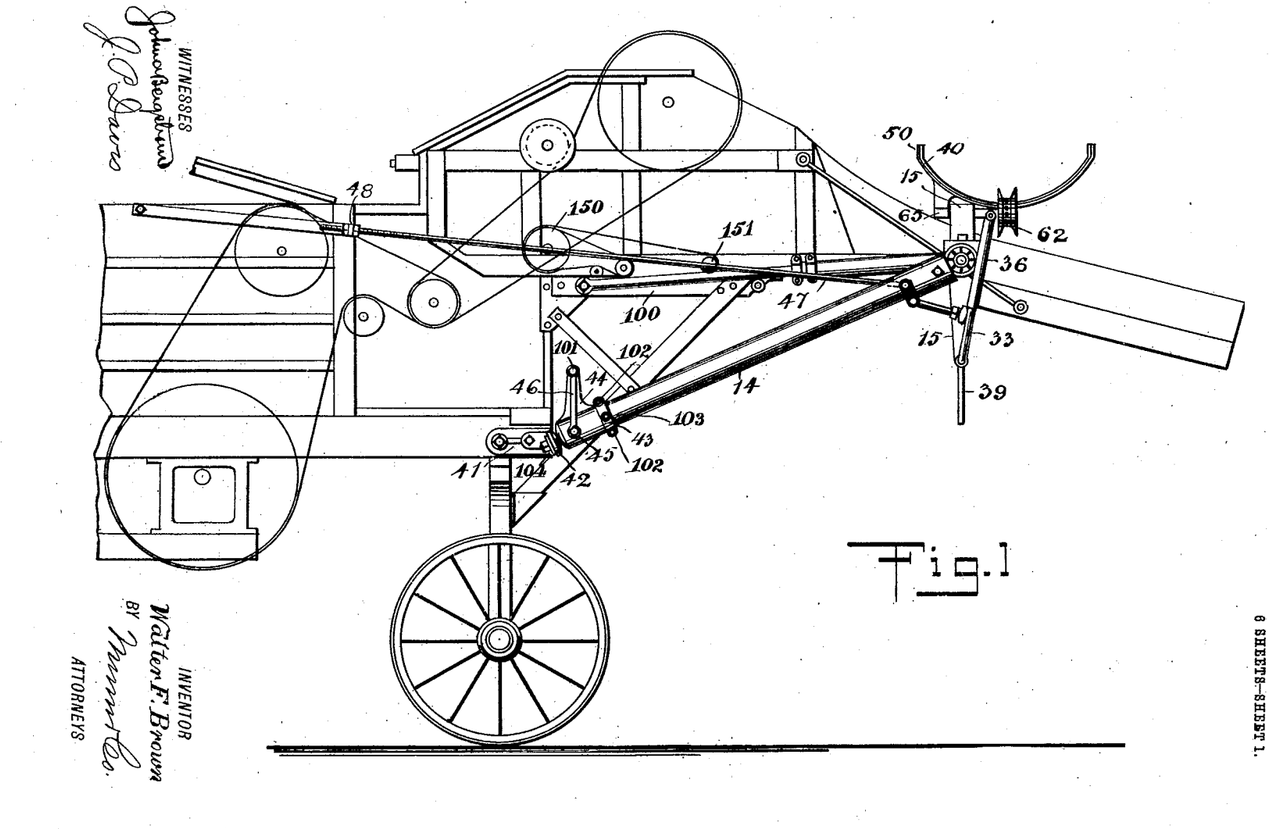
Figure 1 is a side elevation of a threshing machine, having the feeder extended, and being equipped with wing carriers constructed in conformity with the present invention.
Figure 2:
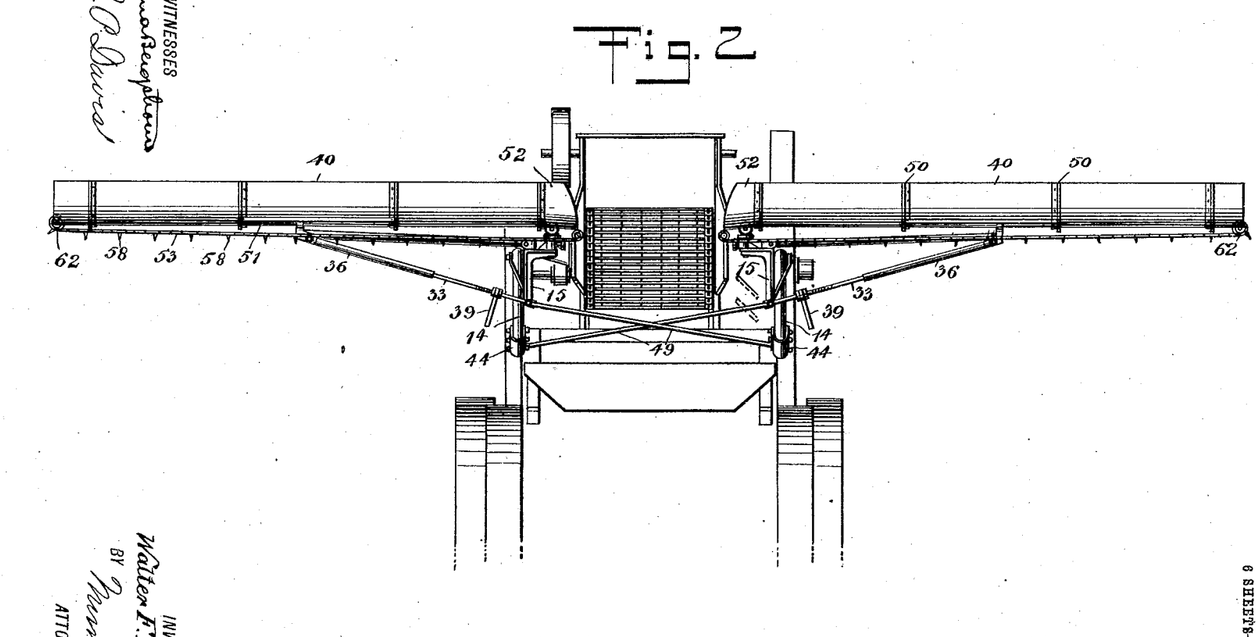
Fig. 2 is a front elevation of the threshing machine, showing thereon the wing carriers constructed in accordance with the present invention, and in operative position.

By means of the construction thus far described, a carrier, such as 40, is supported from the boom 14 near its inner or delivery end, and is provided with means whereby it may be raised or lowered at its receiving or outer end; also whereby the inner or delivery end may be manually adjusted laterally and vertically relative to the feeder, and longitudinally relative to the threshing machine. The boom 14 carries the weight of the carrier trough and the parts attached thereto, mostly by its torsional resistance, and is preferably constructed of suitable pipe of sufficient weight and size to withstand said torsional strain. The boom 14 is secured to the threshing machine at its lower end by the bracketed plate 41, which, in most machines, will be bolted as shown at Fig. 1 to the forward end of the lower side sill of the threshing machine. Said plate 41 of necessity will be of different forms and shapes to fit the construction of this part of the framing, in different makes of threshing machines and therefore the plate 41 will be special for each make of threshing machine which it is to fit. But the bracket 42, which is an integral part of the plate 41 will be the same for all makes of threshing machines. It is provided on its outer face, to receive a rounded surface formed on the lower end of the binder bracket 44, which is bound and bolted to the lower end of the boom 14, with the binder bolts 102 and the cross rods 49, 49.

The binder bracket 44 is maintained in its position on the face of the bracket 42 by a heavy bolt 104, which passes through the lower end of the bracket 44 and the bracket 42. The holes receiving this bolt are larger than the bolt, to permit a pivotal action on the bracket 42 without binding.

Figures 3, 4:
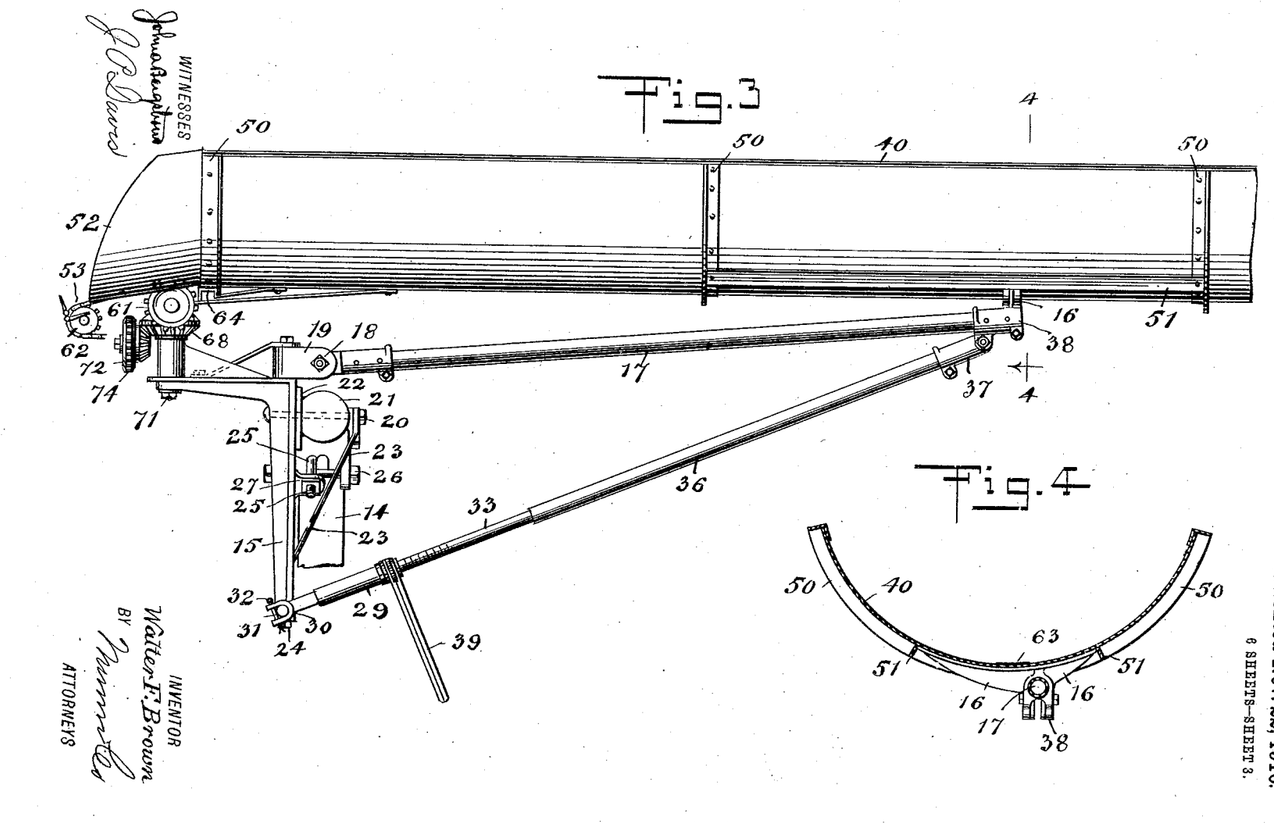
Fig. 3 is an enlarged side view of one of the wing carriers, and the mountings therefor.
Fig. 4 is a cross section of the carrier, as shown in Fig. 3, taken on the line 4—4 of said figure.
Figures 5, 6, 7, 8:
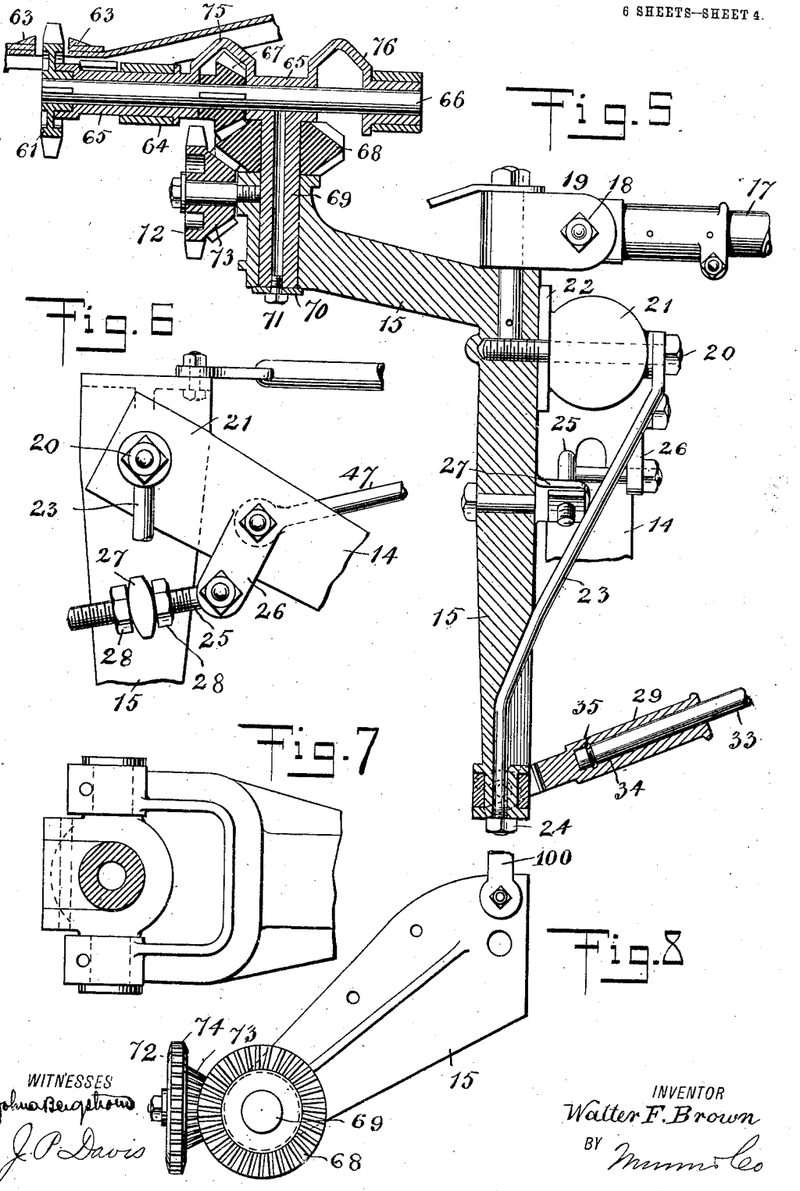
Fig. 5 is a vertical section of the bracket whereon is mounted the driving gear for operating the carrier, and for the supporting arms of the carrier.
Fig. 6 is a detail view of the means for adjusting the position of the delivery end of the carrier.
Fig. 7 is a detail view in plan of one of the adjusting joints employed.
Fig. 8 is a detail view in plan, showing the mounting for the driving gear, and the double bevel gear connected therewith.

The upper end of the raised lug or binder bracket 44 is provided to receive cross rods 49. Said rods are screw-threaded at this point, and are provided with a nut 101 on each side of the raised web 46, by the manipulation of which nuts, the booms 14, are rotated and the brackets 15 (see Fig. 3) may be adjusted to an upright or vertical position relative to the side of the thresher to which it is attached. The other end of the cross-rods 49 pass through the binder bracket 44 and boom 14, and has a collar on the side, as shown at 45. These cross rods receive the torsional strain on the boom 14.

By means of the boom 14 pivoting on the bracket 42, the upper end of the boom bracket 15 may be adjusted to its proper position, horizontally relative to the threshing machine feeder, and is held rigidly in said location by the telescope brace 100, which bolts to the side of the feeder or threshing machine at a point where said feeder or threshing machine is not so wide as the lower side sills.

The boom 14 is supported at its outer end by a rod 47 secured to the side frame of the threshing machine, preferably by being slidably passed through a lug bracket 48. The end of the rod 47 where it passes through the said lug bracket 48 is screw-threaded and provided with screw-nuts seated at either side of said lug bracket 48, whereby the rod may be taken up or let out and locked in the desired position. As the rod is thus retracted or extended, the free or outer end of the boom 14 is raised or lowered, swinging on the bracket lug 42 as a pivot. The length of the rod 47 determines the height of the bracket 15 relative to the delivery point on the threshing machine feeder.

The rods 100, 47, 101 and 45, are to be screwed up tight and fixed in position when they have been adjusted, so that the bracket 15 will have its proper location relative to the threshing machine feeder.

The supporting members of the present invention may be said to be the boom 14, the rods 47 and brace 100, constituting a tripod arrangement to extend from the frame of the threshing machine, and converging at the forward end, upon a holding device, directly connected with the wing-carriers.

The frame of the carrier 40 is constructed of any desired material, preferably a light-weight material, which is reinforced by metal hoops 50. Between two of the hoops 50 and extended longitudinally with the said carrier, are provided rails formed preferably from angle-iron 51, the ends of the saddle resting within and sliding upon these rails 51. The carriers may be extended to any suitable length, providing the strength of the structure of the bracket 15 and the boom 14 will permit. The rod 17 and pipe member 36 may be elongated to any extent, thereby accommodating a carrier of great length. At the inner end of the carrier is provided a chute-like extension 52, which is set at a downward angle from the carrier, so that when the end of the carrier is depressed to accommodate the feeding workmen, the extension 52 will yet remain in a position not above the horizontal. This is very desirable, as it is at this point that the carrying members of the advancing chain release their hold on the material being handled. If, when released, this material were upon a surface inclined away from the line of delivery, the material would tend to retract, and effect a blocking or massing of the material at the delivery end of the carrier, which is undesirable. The inclination of this part of the carrier trough is also necessary to allow proper driving engagement between the driving sprocket 61 and chain of the conveyer. It also permits the raising of the bracket 15 so that the screw-bolt 71 will at all times clear the driving belt, and the delivery end of the carrier trough to be at its proper relative position to the threshing machine feeder.

Figures 9, 10, 11:
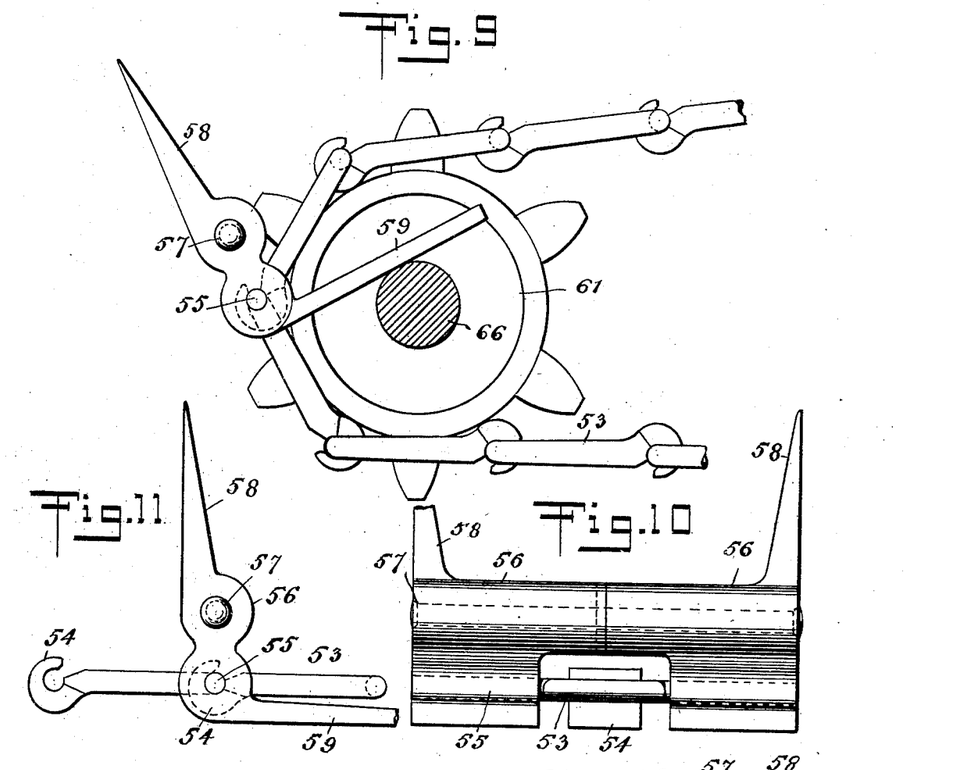
Fig. 9 is a side view of the driven sprocket wheel, together with the sprocket chain and carriers connected therewith.
Fig. 10 is a detail view in end elevation, showing the carriers in operative position, and the sprocket chain in connection therewith.
Fig. 11 is a side view of the elements shown in Fig. 10.
Figure 12:
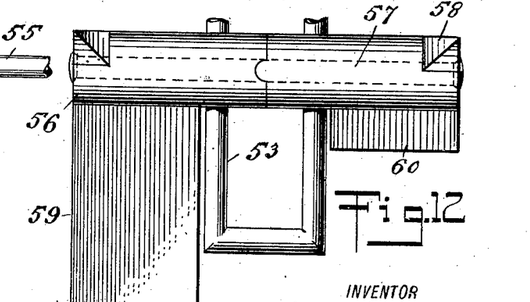
Fig. 12 is a top plan view of the same elements.
Figure 13:
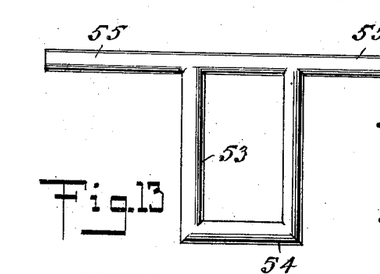
Fig. 13 is a detail view in plan, showing the construction of the links for the sprocket chain which are employed to mount the carriers.
Figure 14:
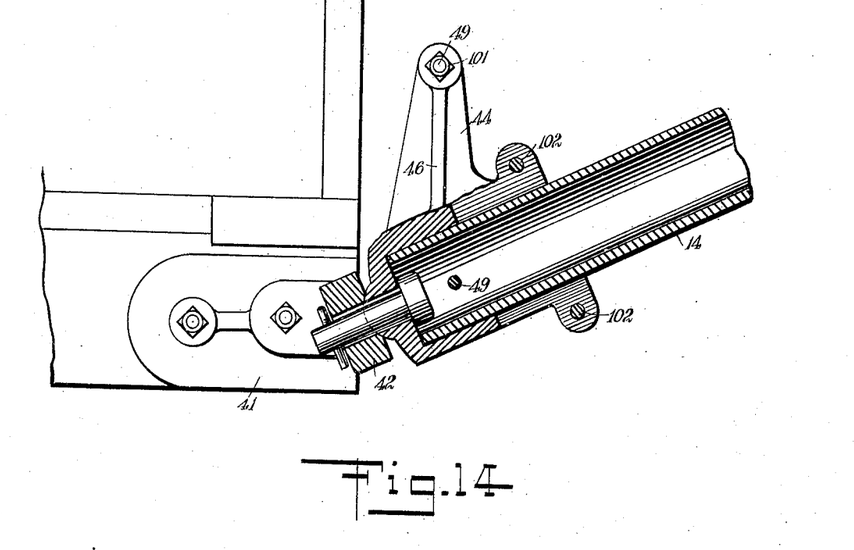
Fig. 14 is a detail view on an enlarged scale, partly in side elevation and partly in vertical section, of the boom and connections therefor with a threshing machine of usual construction.
Figure 15:
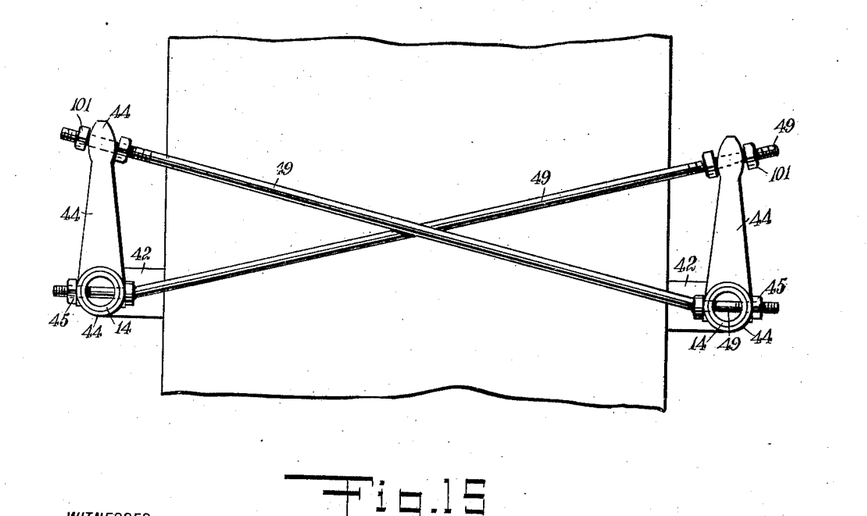
Fig. 15 is a detail view on an enlarged scale, of the brackets for holding the booms and the connecting rods between the same for maintaining the vertical position thereof.

Extended longitudinally throughout the carrier is a linked elevator, consisting of an endless chain composed of hooked links 53, each of which is provided with a hook 54, the hooks being adapted to engage the end of the links. Certain of the links 53 are provided with lateral extensions 55 pivotally engaging the carriers 56, nested and bolted together by a long rivet bolt 57. Perforations are provided in the lower extension of the carriers, to receive the lateral extensions 55 of the links 53. When the bolt 57 is inserted and set through the body portion of the carriers 56, the lateral extensions 55 are prevented from being withdrawn from the perforations provided in the carriers. The carriers 56 have two tine-like extensions 58, which are maintained in the upright position shown in Fig. 11 of the drawings, by tail pieces 59 and 60, which differ in length, as shown in Fig. 12 of the drawings, for the reason that on one side of the carrier chain, the sprockets would interfere with the drop of the tail piece.

The chain is driven by a sprocket wheel 61, which is located at the inner end of the carrier, and extends upward through the floor of the same, the chain being supported at its outer end by a suitable idler 62. The tail pieces 59 and 60 slide upon a sole plate 63, upon which the conveyer chain travels. The inner or delivery end of the carrier trough is supported by a strap bracket 64 securely bolted to the inner rib of the carrier trough, and is hinged to a T-shaped bearing frame 65. The said hinge 64 or strap bracket is radially central with the driving sprocket 61, shaft 66 and bevel gear 67, thereby permitting the outer end of the carrier trough to be raised or lowered without disturbing the alinement of any of the above transmission elements. It is at this point where the carrier trough pivots in the vertical adjustment of its outer end. In the bearing T-frame 65, a transmission shaft 66 is mounted, upon the end of which is fixedly mounted a driving sprocket 61, whose inner hub is housed by an enlarged annular end of the bearing T-frame 65. Said housing is to prevent winding or wrapping of material on the hub or shaft. The shaft 66 has also fixedly mounted thereon a bevel gear 67, which is in mesh with the upper side of a double bevel gear 68, whose plane of rotation is horizontal, and which is mounted rotatably on an extended vertical sleeve of the bracket 15. Inside of this sleeve on the bracket 15, there is pivotally mounted the lower end of the T-bearing frame 65, as shown at 69, whose rotary axis is radial with the axis of the gear 68, and is rotatably held in the said sleeve by means of a suitable washer 70 and screw-bolt 71. The other end of the carrier trough may be moved in a horizontal plane (pivoting at this point) without disturbing the alinement of the said elements of transmission. Thus it will be seen that the outer end of the carrier trough may be raised or lowered or swung horizontally in all directions, without in any manner disturbing the alinement of any of the elements of transmission. And the transmitting machinery may be running freely at the time that the outer end of the carrier trough is being so swung, and moved as above mentioned.

The bevel gear 68 receives its movement from a driving sprocket wheel 72, provided with a bevel gear extension 73, which is in toothed engagement with the bevel gear 68, and is driven by a sprocket chain 74 led from a convenient rotating shaft of the machine to which the wing-carriers are attached, preferably from the shaft that drives the apron of the feeder.

The bearing member for the shaft 66 is framed to form the housings 75 and 76, both of which are adapted to receive a gear 67 in engagement with the gear 68. The engagement of the gear 67 with the gear 68 on the reverse side thereof, will, however, reverse the rotary direction of the shaft 66. This construction provides a simple and efficient means for reversing the action of the driving sprocket wheel 61 when the same is shifted from the one side of the thresher to the other, or when attached to certain makes of threshers which require a reversal of the drive.

With an apparatus constructed as above described, the operation would be as follows. The threshing machine on which it is desired to mount the carrier is provided with the plate 41 and the bracket 48 on both sides of the threshing machine. The booms 14 are suitably attached to the brackets 15 in the manner described. The booms are then connected, as described, to the plates 41 and raised to thread the rods 47, through the bracket 48, where secured. The other end of the boom is swung into position with reference to the feeding mechanism of the thresher.

By means of the telescope brace 100 and the rod 47 when rigidly fixed in position, the bracket 15 is held in a fixed position relative to the side of the feeder. The cross tie-rods 49 are fastened to the pipe binder bracket 44, as previously described, and the nuts 101 are adjusted on the rods 49 so as to bring the bracket 15 to a vertical position relative to the parts of the side of the thresher. The tie rods 47 are adjusted by the nuts 48 so as to bring the bracket 15 to its proper relative height to the feeder carrier.

The nuts 28 on the eye bolt 25 should be manipulated so as to bring the vertical portions of the bracket 15 into a vertical position relative to the vertical parts of the machine to which it is attached, and all the nuts on all the bolts and rods relative hereto should be drawn up tight and the bracket 15 rigidly fixed in this position. The carriers 40 are placed in position, the free or outer end resting on the ground, or on a trestle, at the option of the operator, until the bracket 64 is secured in position upon the carriers. The saddle 16 is then placed in position on the tracks 51, and the carrier raised, until the pivotal extensions 30 may be inserted over the pivots 31, and the cotter-pin 32 placed in position. If, now, it is desired to move the threshing machine from say the barn to the field, the wing carriers 40 are rotated upon the pivots 69 until the carriers 40 rest along the side of the thresher, where they are suitably bound, or otherwise fastened. It will be seen that the device in this position is snugly held. Arriving at the field, the wings 40 are rotated on the pivot 69, so that the wings extend laterally. By means of the rod or pipe member 36, the outer end is adjusted to the desired height. The carrier may be swung so as to shift the receiving end laterally. The device is now in position to operate. As the grain-bearing straw is thrown on to the carriers, it is advanced by the tines 58 of the carrier belt, and delivered to the feeder of the threshing machine. At the inner end, the tines 58 pass over the depressed ends 52 of the carriers when the tail pieces 59 and 60 drop from the tracks 63 and permit the tines to sway backward upon the line of pull of the chain, thus releasing the material being handled. The tail pieces 59 and 60 are righted to the upright position; when having passed over the outer end of the wings 40, they pass over the idler 62 and again rest upon the sole plate 63. The operation continues as described. When now it becomes desirable to shift the wings so as to change the position of the receiving end thereof, this is done by rotating the rod 33 by means of the handle 39 which operates to raise and lower said end. The carriers are shifted laterally by manually moving the carriers to the position desired. The swing of the carriers about the pivot 69 in no wise interferes in the driving operation of the carrier chains, as the wheel 72 remains in its original relation with the other gear wheels.

Having thus described my invention what I claim as new and desire to secure by Letters Patent is;

1. A wing carrier, comprising a chute provided at the inner end with a vertically disposed pivot, a socket bearing member adapted to receive said pivot, a boom adapted to be secured upon a suitable structure and to receive at its outer end the said socket bearing member, an attaching device for holding the said member on said boom, embodying a pivot and means for clamping the said member rigidly upon said boom, and a plurality of holding devices secured at the end of said boom to hold the same in position.

2. A wing carrier, comprising a chute provided at the inner end with a vertically disposed pivot, an endless belt carrier adapted to move longitudinally in said chute, an operating mechanism for the said belt carrier, embodying a gear mounted concentric with said pivot, said mechanism being adapted to swing about said pivot, a socket bearing member adapted to receive said pivot, a boom adapted to be secured upon a suitable structure and to receive at its outer end the said socket bearing member, an attaching device for holding the said member on said boom, embodying a pivot and means for clamping the said member rigidly upon said boom, and a plurality of holding devices secured at the end of said boom to hold the same in position.

3. A wing carrier, comprising a chute provided at the inner end with a vertically disposed pivot, an endless belt carrier adapted to move longitudinally in said chute and having a series of upright projecting fingers to engage and advance the material being handled in said chute, an operating mechanism for the said belt carrier, consisting in a chain of gears transmitting the motion from a driven sprocket wheel to a sprocket wheel engaging said belt carrier, one of said chain of gears being mounted upon and concentric with said pivot, a boom secured upon a suitable structure to support at its outer end the said pivot, and a plurality of holding devices secured at the end of said boom to hold the same in position.

4. A wing carrier, comprising a chute provided at the inner end with a vertically disposed pivot, an endless belt carrier adapted to move longitudinally in said chute and having a series of upright projecting fingers to engage and advance the material being handled in said chute, an operating mechanism for the said belt carrier, consisting in a chain of gears transmitting the motion from a driven sprocket wheel to a sprocket wheel engaging said belt carrier, one of said chain of gears being mounted upon and concentric with said pivot, a socket bearing member adapted to receive the said pivot and to be secured upon a supporting boom, a boom secured upon a suitable structure to support at its outer end the said socket bearing member, an attaching device for holding the said member on said boom, embodying a pivot and means for clamping the said member rigidly upon said boom, and a plurality of holding devices secured at the end of said boom to hold the same in position.

5. A wing carrier, comprising an elongated chute adapted to extend laterally from its support, a bracket mounted at one end of said chute, a boom engaged with said bracket and inclined downwardly therefrom, said boom being secured upon a suitable structure, longitudinally adjustable supporting members connected pivotally to said bracket and slidably to the extended portion of said chute, and a plurality of holding devices secured at the end of said boom, and a bracket to hold same in position.

6. A wing carrier, comprising an elongated chute adapted to extend laterally from its support, a bracket mounted at one end of said chute, a boom engaged with said bracket and inclined downwardly therefrom, said boom being secured upon a suitable structure, longitudinally adjustable supporting members connected pivotally to said bracket and slidably to the extended portion of said chute, and a plurality of longitudinally adjustable holding devices secured at the end of said boom and to the said structure on which the boom is mounted, the points of securement on the said structure being disposed above the lower end of said boom and in widely separated arrangement to brace the said boom.

7. A wing carrier, comprising an elongated chute adapted to extend laterally from its support, a bracket mounted at one end of said chute and embodying a pivot, a boom engaged with said bracket and inclined downwardly therefrom, said boom being secured upon a suitable structure, longitudinally adjustable supporting members connected pivotally to said bracket and slidably to the extended portion of said chute, and a plurality of longitudinally adjustable holding devices secured at the end of said boom and to the said structure on which the boom is mounted, the points of securement on the said structure being disposed above the lower end of said boom and in widely spread arrangement to brace the said boom.

8. A wing carrier, comprising an elongated chute provided at the inner end with a pivot, a bracket forming a socket for said pivot, a boom engaged with said bracket and inclined downwardly therefrom, said boom being secured upon a suitable structure, longitudinally adjustable supporting members connected pivotally to said bracket and slidably to the extended portion of said chute, and a plurality of longitudinally adjustable devices secured at the end of said boom and to the said structure on which the boom is mounted, the points of securement on the said structure being disposed above the lower end of said boom in widely separated arrangement to brace the said boom.

9. A wing carrier, comprising an elongated chute, a bracket embodying two sections pivotally joined, one of said sections being mounted on the end of said chute, a boom adapted to engage the section of the said bracket not secured upon the said chute, said boom being inclined downwardly and adapted to be secured upon a suitable structure, longitudinally adjustable supporting members connected pivotally to said bracket and slidably to the extended portion of said chute, and a plurality of longitudinally adjustable holding devices secured at the end of said boom and to the said structure on which the boom is mounted, the points of securement on the said structure being disposed above the lower end of said boom and in widely separated arrangement to brace the said boom.

10. A wing carrier, comprising a chute provided at the inner end with a vertically disposed pivot, a boom secured upon a suitable structure and having at its outer end a bracket to receive said pivot, a longitudinally extended member of fixed length pivotally attached to said bracket and slidably connected with the extended portion of said carrier, a longitudinally adjustable supporting member connected pivotally to said bracket at a point removed vertically from said member of fixed length at the outer end thereof, means for varying the length of said adjustable supporting member, and a plurality of longitudinally adjustable holding devices secured at the end of said boom and to the said structure on which the boom is mounted, the points of securement on the said structure being disposed above the lower end of said boom and in widely separated arrangement to brace the boom.

11. A wing carrier, comprising a chute provided at the inner end with a vertically disposed pivot, a boom supported upon a suitable structure and having at its outer end a socketed bracket pivotally mounted thereon, said pivotal mounting being extended at an angle to said socket, said socket being adapted to receive said vertically disposed pivot, a longitudinally extended member of fixed length pivotally attached to said bracket and slidably connected with the extended portion of said carrier, a longitudinally adjustable supporting member connected pivotally to said bracket at a point removed vertically from said member of fixed length, and connected pivotally to said member of fixed length at the outer end thereof, and means for varying the length of said adjustable supporting member, and a plurality of longitudinally adjustable holding devices secured at the end of said boom and to the said structure on which the boom is mounted, the points of securement on the said structure being disposed above the lower end of the boom and in widely separated arrangement to brace the said boom.

12. A wing carrier, comprising a chute provided at the inner end with a vertically disposed pivot, a socket bracket to receive said pivot, a boom secured upon a suitable structure and having attached at its outer end the said socket bracket, a pivotal mounting for receiving the said bracket on said boom embodying a pivot and means for clamping the said bracket rigidly upon said boom, a longitudinally extended member of fixed length pivotally attached to said bracket and slidably connected with the extended portion of said carrier, a longitudinally adjustable supporting member connected pivotally to said bracket at a point removed vertically from said member of fixed length, and connected pivotally to said member of fixed length at the outer end thereof, means for varying the length of said adjustable supporting member, and a plurality of longitudinally adjustable holding devices secured at the end of said boom and to the said structure on which the boom is mounted, the points of securement on the said structure being disposed above the lower end of said boom and in widely separated arrangement to brace the said boom.

13. A wing carrier, comprising a chute provided at the inner end with a vertically disposed pivot, an endless belt carrier adapted to move longitudinally in said chute, an operating mechanism for the said belt carrier embodying a gear mounted concentric with said pivot, said mechanism being adapted to swing about said pivot, a socket bearing bracket adapted to receive said pivot, a boom secured upon a suitable structure and to receive at its outer end the said bracket, an attaching device for holding the said bracket on said boom, embodying a pivot and means for clamping the said bracket rigidly upon said boom, a longitudinally extended member of fixed length pivotally attached to said bracket and slidably connected with the extended portion of said carrier, a longitudinally adjustable supporting member connected pivotally to said bracket at a point removed vertically from said member of fixed length, and connected pivotally to said member of fixed length at the outer end thereof, means for varying the length of said adjustable supporting member, and a plurality of longitudinally adjustable holding devices secured at the end of said boom and to the said structure on which the boom is mounted, the points of securement on the said structure being disposed above the lower end of said boom and in widely separated arrangement to brace the said boom.

14. A wing carrier, comprising a chute provided at the inner end with a vertically disposed pivot, an endless belt carrier adapted to move longitudinally in said chute and having a series of upright projecting fingers to engage and advance the material being handled in said chute, an operating mechanism for the said belt carrier, consisting in a chain of gears transmitting the motion from a driven sprocket wheel to a sprocket wheel engaging said belt carrier, one of said chain of gears being mounted upon and concentric with said pivot, a boom secured upon a suitable structure, a bracket mounted upon said boom at its outer end to receive the said pivot, a longitudinally extended member of fixed length pivotally attached to said bracket and slidably connected with the extended portion of said carrier, a longitudinally adjustable supporting member connected pivotally to said bracket at a point removed vertically from said member of fixed length, and connected pivotally to said member of fixed length at the outer end thereof, means for varying the length of said adjustable supporting member, and a plurality of longitudinally adjustable holding devices secured at the end of said boom and to the said structure on which the boom is mounted, the points of securement on the said structure being disposed above the lower end of said boom and in widely separated arrangement to brace the said boom.

15. A wing carrier, comprising a chute provided at the inner end with a vertically disposed pivot, an endless belt carrier adapted to move longitudinally in said chute and having a series of upright projecting fingers to engage and advance the material being handled in said chute, an operating mechanism for the said belt carrier, consisting in a chain of gears transmitting the motion from a driven sprocket wheel to a sprocket wheel engaging said belt carrier, one of said chain of gears being mounted upon and concentric with said pivot, a socket bearing bracket adapted to receive the said pivot and to be secured upon a supporting boom, a boom secured upon a suitable structure and to receive at its outer end the said socket-bearing bracket, an attaching device for holding the said bracket on said boom, embodying a pivot and means for clamping the said bracket rigidly upon said boom, a longitudinally extended supporting member of fixed length pivotally attached to said bracket and slidably connected with the extended portion of said carrier, a longitudinally adjustable supporting member connected pivotally to said bracket at a point removed vertically from said member of fixed length, and connected pivotally to said member of fixed length at the outer end thereof, means for varying the length of said adjustable supporting member, and a plurality of longitudinally adjustable holding devices secured at the end of said boom and to the said structure on which the boom is mounted, the points of securement on the said structure being disposed above the lower end of said boom and in widely separated arrangement to brace the said boom.

16. A wing carrier embodying a supporting device comprising a rigid boom; a pivotal mounting for said boom fixedly attached to the structure with which the said carrier is connected; and supporting braces pivotally connected to the outer end of said boom and to the structure with which the carrier is connected and at points raised above the said pivotal mounting and laterally separated to each side of the said pivotal mounting.

17. A wing carrier embodying supporting devices comprising a plurality of rigid booms; a plurality of pivotal mountings, one of said mountings being fixedly attached to the structure with which the carrier is connected and at the opposite sides thereof; a plurality of supporting braces pivotally connected to the outer end of said booms and to the structure with which the carrier is connected and at points raised above the said pivotal mountings and laterally supported on each side of said pivotal mountings; a plurality of vertically extended arms fixedly connected to said booms; and a plurality of crossed tie rods connecting the said vertically extended arms, said rods being connected to the lower end of one of said arms and the upper end of the other of said arms to distribute the torsional strain when produced on said booms.

18. A wing carrier embodying supporting devices comprising a plurality of rigid booms; a plurality of pivotal mountings, one of said mountings being fixedly attached to the structure with which the carrier is connected and at the opposite sides thereon; a plurality of supporting braces pivotally connected to the outer end of said booms and to the structure with which the carrier is connected and at points raised above the said pivotal mountings and laterally supported on each side of said pivotal mountings; a plurality of vertically extended arms fixedly connected to said booms; a plurality of crossed tie rods connecting the said vertically extended arms, said rods being connected to the lower end of one of said arms and the upper end of the other of said arms to distribute the torsional strain when produced on said booms; and means for varying the extension of said supporting braces.

19. In a wing carrier and for the chute thereof a mounting comprising a pivot having vertical and horizontal extensions, the horizontal extensions being formed to provide an internal bearing for a driving shaft divided on opposite sides of said vertical extensions, and housings connecting said divisions, said horizontal extensions forming external pivotal bearings for supporting brackets connected with said chute; a driving shaft pivotally mounted in said internal bearings; a transmission mechanism embodying a rotary driving gear mounted concentrically with and surrounding the said vertical extension; and a miter gear adapted to engage said driving gear and to be fixedly mounted upon said shaft to be alternately held in the spaces between the said divisions of the horizontal bearings on opposite sides of said vertical extension whereby the rotary direction of the said shaft may be reversed.

In testimony whereof I have signed my name to this specification in the presence of two subscribing witnesses.

WALTER FRANK BROWN.

Witnesses:
ALEX BORE,
R. S. HUME.